United States Patent
Yang et al.

(10) Patent No.: US 8,306,425 B2
(45) Date of Patent: Nov. 6, 2012

(54) HIGH-DEGREE RECONFIGURABLE OPTICAL ADD-DROP MULTIPLEXING SYSTEMS USING BI-DIRECTIONAL WAVELENGTH SELECTIVE SWITCHES

(75) Inventors: Xiaohui Yang, Odenton, MD (US); Zhonghua Zhu, Essex, MD (US); Jun Bao, Ellicott City, MD (US)

(73) Assignee: Ciena Corporation, Hanover, MD (US)

( * ) Notice: Subject to any disclaimer, the term of this patent is extended or adjusted under 35 U.S.C. 154(b) by 811 days.

(21) Appl. No.: 12/356,593

(22) Filed: Jan. 21, 2009

(65) Prior Publication Data
US 2010/0183311 A1    Jul. 22, 2010

(51) Int. Cl.
*H04J 14/02* (2006.01)
*H04J 14/00* (2006.01)
(52) U.S. Cl. ............................. 398/83; 398/48
(58) Field of Classification Search ............ 398/83, 398/45, 48, 79, 82
See application file for complete search history.

(56) References Cited

U.S. PATENT DOCUMENTS

| | | | |
|---|---|---|---|
| 7,720,383 B2* | 5/2010 | Akiyama et al. | 398/83 |
| 2007/0269211 A1 | 11/2007 | Doerr et al. | |
| 2007/0286605 A1 | 12/2007 | Feuer et al. | |
| 2008/0056715 A1 | 3/2008 | Akiyama et al. | |

* cited by examiner

*Primary Examiner* — Jack Dinh
(74) *Attorney, Agent, or Firm* — Clements Bernard PLLC; Christopher L. Bernard; Lawrence A. Baratta, Jr.

(57) ABSTRACT

The present disclosure provides high-degree reconfigurable optical add-drop multiplexing (ROADM) systems using bi-directional wavelength selective switches (WSSs) and optical circulators. A single WSS is utilized on each degree of a node in a bi-directional manner, i.e. both ingress and egress share the same WSS. Advantageously, the present invention eliminates conventional splitters/combiners thereby capping intra-node insertion loss to a certain value regardless of the number of degrees. More importantly, the present invention reduces noise penalty associated with high-degree nodes while minimizing cost.

20 Claims, 9 Drawing Sheets

US 8,306,425 B2

HIGH-DEGREE RECONFIGURABLE OPTICAL ADD-DROP MULTIPLEXING SYSTEMS USING BI-DIRECTIONAL WAVELENGTH SELECTIVE SWITCHES

FIELD OF THE INVENTION

The present invention relates generally to optical networking. More particularly, the present invention provides high-degree reconfigurable optical add-drop multiplexing (ROADM) systems using bi-directional wavelength selective switches (WSSs) which use a circulator on a common port and local add/drop ports to enable bi-directional ingress/egress into the bi-directional wavelength selective switches.

BACKGROUND OF THE INVENTION

Metro Dense Wave Division Multiplexed (DWDM) systems are evolving from ring-based topologies to mesh-based topologies as bandwidth requirements continue to grow. Wavelength selective switches (WSSs) are considered a key optical component to realize a high-degree reconfigurable optical add-drop multiplexer (ROADM) node. WSSs are used in DWDM networks to provide dynamic switching on a per-wavelength or a per-group of wavelengths level. WSSs can be used at network ingress, egress, or both to route/collect the traffic to/from different network directions. As described herein, network directions are referred to as degrees. For example, a two-degree node has two network directions, e.g. east and west, and a four-degree node has four network directions, e.g. north, south, east, and west. Generally, DWDM networks can include multiple nodes of varying degrees. However, considering the WSS is an expensive optical component, usually WSSs are implemented only at either the ingress or the egress of the node and an optical splitter or combiner is used at the other end instead.

Referring to FIG. 1, a common structure is illustrated for a conventional four-degree node 100 that may be used in a DWDM network. The node 100 includes a north direction 102, a south direction 104, a west direction 106, and an east direction 108. Each direction 102, 104, 106, 108 provides ingress/egress for each wavelength bi-directionally. Each of the directions 102, 104, 106, 108 is also interconnected to one another through a plurality of connections 110. The connections 110 enable a mesh architecture at the node 100 allowing any wavelength to be directed from any degree to any other degree, i.e. optical pass-through at the node 100.

As described herein, the node 100 includes a WSS 112 at each ingress for each direction 102, 104, 106, 108. The WSS 112 can include a 1×5, 1×9, or the like device. To indicate device fan out, WSSs 112 are often classified as "1×N" devices, with a "1×9" WSS meaning a 10 port device, with one common input and nine output ports. Here, the WSS 112 is illustrated with one input port (from the ingress), three drop ports for local add/drop, and three ports each connected to other directions. Accordingly, to scale the node 100, the WSS 112 must include additional ports to connect to the new directions. The egress direction for each direction 102, 104, 106, 108 includes a combiner and post amp 114. The combiner is configured to multiplex locally added wavelengths and wavelengths from each of the other directions, and the post amp provides optical amplification.

When the network degree of the node 100 scales above four, assuming two to four common add/drop ports are planned as is common, the coupler's insertion loss (IL) can be even larger than 10 dB, which requires a high gain post-amplifier to compensate intra-node loss. This introduces additional noise into the path. The equivalent noise figure (NF) of the combiner and post amp 114 can be simplified as the insertion loss plus the NF of the post amp. For every 3 dB additional combiner loss, the additional noise added will be doubled. Eventually, this will impact system reach and limit the number of degrees the node 100 can be scaled to and the reach between nodes 100. Referring to FIG. 2, a graph 200 illustrates an equivalent span penalty 202 with different combiner losses 204 as a function of span loss 206. To improve system reach, the combiner loss has to be reduced to reduce the equivalent span penalty and limit the degrees of the node 100. The combiner and post amp 114 could be replaced with a symmetrically configured WSS, but this adds another WSS 114 for each direction which significantly increases cost and network complexity.

BRIEF SUMMARY OF THE INVENTION

In various exemplary embodiments, the present provides high-degree reconfigurable optical add-drop multiplexing (ROADM) systems using bi-directional wavelength selective switches (WSSs) and optical circulators. A single WSS is utilized on each degree of a node in a bi-directional manner, i.e. both ingress and egress share the same WSS. Advantageously, the present invention eliminates conventional splitters/combiners thereby capping intra-node insertion loss to a certain value regardless of the number of degrees. More importantly, the present invention reduces noise penalty associated with high-degree nodes while minimizing cost.

In an exemplary embodiment of the present invention, a high-degree reconfigurable optical add-drop multiplexing node includes a plurality of degrees each with an ingress and an egress; wherein each of the plurality of degrees include a circulator including a first port, a second port, and a third port, wherein the ingress is coupled to the first port and the egress is coupled to the second port; and a bidirectional wavelength selective switch coupled to the third port, the circulator is configured to direct optical signals between the ingress, the egress, and the bidirectional wavelength selective switch. The high-degree reconfigurable optical add-drop multiplexing node can further include one or more local add/drop ports coupled to the bidirectional wavelength selective switch. Each of the one or more local add/drop ports can include a local ingress and a local egress; a second circulator including a fourth port, a fifth port, and a sixth port, wherein the local ingress is coupled to the fourth port and the local egress is coupled to the fifth port; and a second bi-directional wavelength selective switch coupled to the sixth port, the second circulator is configured to direct optical signals between the local ingress, the local egress, and the second bi-directional wavelength selective switch. Optionally, the bi-directional wavelength selective switch includes a common port coupled to the third port and N ports, N being an integer greater than one. The high-degree reconfigurable optical add-drop multiplexing node can further include a plurality of interconnections between the plurality of degrees, wherein each of the plurality of interconnections include a connection on one of the N ports of each bi-directional wavelength selective switch. The plurality of degrees can include up to N degrees. Optionally, the plurality of degrees include X degrees, X being an integer, wherein the high-degree reconfigurable optical add-drop multiplexing node further includes Y local add/drop ports, Y being an integer, and wherein X+Y is less than or equal to N. The high-degree reconfigurable optical add-drop multiplexing node includes no combiners thereby fixing insertion loss in the high-degree reconfigurable optical add-drop multiplexing node regardless of the number of the plurality of degrees.

In another exemplary embodiment of the present invention, an optical degree for reconfigurable optical add-drop includes an ingress port; an egress port; an optical circulator including a first port, a second port, and a third port, the first port coupled to the ingress port and the second port coupled to the egress port; a bi-directional wavelength selective switch coupled to the third port thereby enabling optical signals between the bi-directional wavelength selective switch, the ingress port, and the egress port; and one or more interconnections from a plurality of ports on the bi-directional wavelength selective switch, the one or more interconnections connect to additional optical degrees. The bi-directional wavelength selective switch includes 1×N ports, N being an integer greater than one. The optical degree can further include a plurality of local add/drop ports, wherein the quantity of local add/drop ports is less than or equal to N. Each of the plurality of local add/drop ports can include a local ingress and a local egress; a second circulator including a fourth port, a fifth port, and a sixth port, wherein the local ingress is coupled to the fourth port and the local egress is coupled to the fifth port; and a second bi-directional wavelength selective switch coupled to the sixth port, the second circulator is configured to direct optical signals between the local ingress, the local egress, and the second bi-directional wavelength selective switch. Optionally, the optical degree is utilized in a reconfigurable optical add/drop node including up to N degrees. The optical degree includes no combiners thereby fixing insertion loss in the reconfigurable optical add/drop node regardless of the number of degrees.

In yet another exemplary embodiment of the present invention, an optical network includes one or more low-degree nodes; one or more high-degree nodes; optical interconnections between the one or more low-degree nodes and the one or more high degree nodes; wherein each of the one or more high-degree nodes includes a plurality of degrees each including an ingress and an egress; wherein each of the plurality of degrees includes a circulator including a first port, a second port, and a third port, wherein the ingress is coupled to the first port and the egress is coupled to the second port; and a bi-directional wavelength selective switch coupled to the third port, the circulator is configured to direct optical signals between the ingress, the egress, and the bi-directional wavelength selective switch. The one or more low-degree nodes can include a wavelength selective switch and an optical combiner, and wherein the one or more low-degree nodes are configured to provide gain equalization. Optionally, the one or more high-degree nodes do not provide gain equalization. The one or more high-degree nodes include no combiners thereby fixing insertion loss in the one or more high-degree nodes regardless of the number of degrees. Optionally, the one or more low-degree nodes each include less than four degrees and the one or more high-degree nodes include four or more degrees. Alternatively, the one or more low-degree nodes each include four or less degrees and the one or more high-degree nodes include more than four degrees.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present provides high-degree reconfigurable optical add-drop multiplexing (ROADM) systems using bi-directional wavelength selective switches (WSSs) and optical circulators. A single WSS is utilized on each degree of a node in a bi-directional manner, i.e. both ingress and egress share the same WSS. Advantageously, the present invention eliminates conventional splitters/combiners thereby capping intra-node insertion loss to a certain value regardless of the number of degrees. More importantly, the present invention reduces noise penalty associated with high-degree nodes while minimizing cost.

Figure 1:
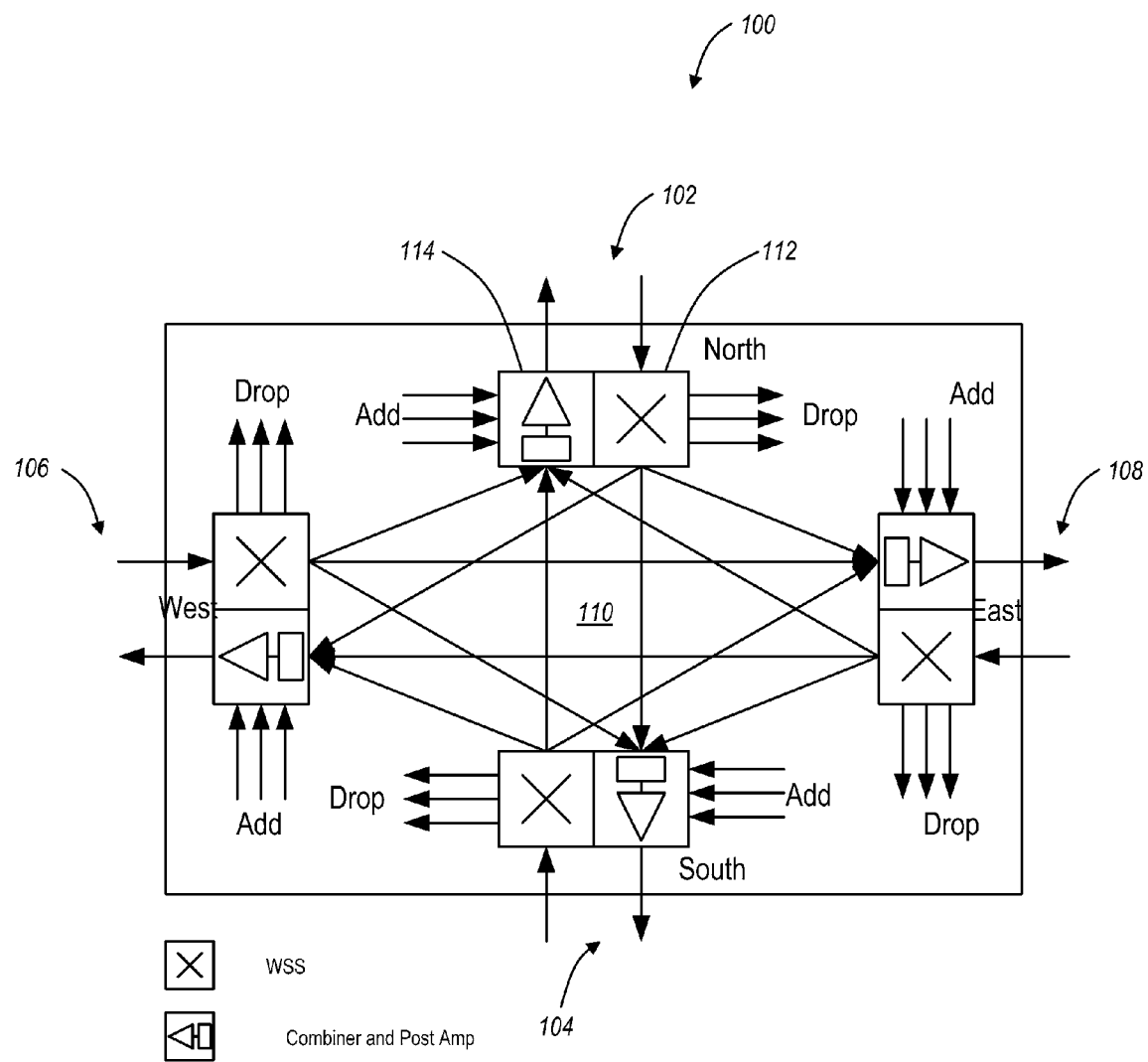
FIG. 1 is a diagram of a common structure for a conventional four-degree node that may be used in a DWDM network.
Figure 2:
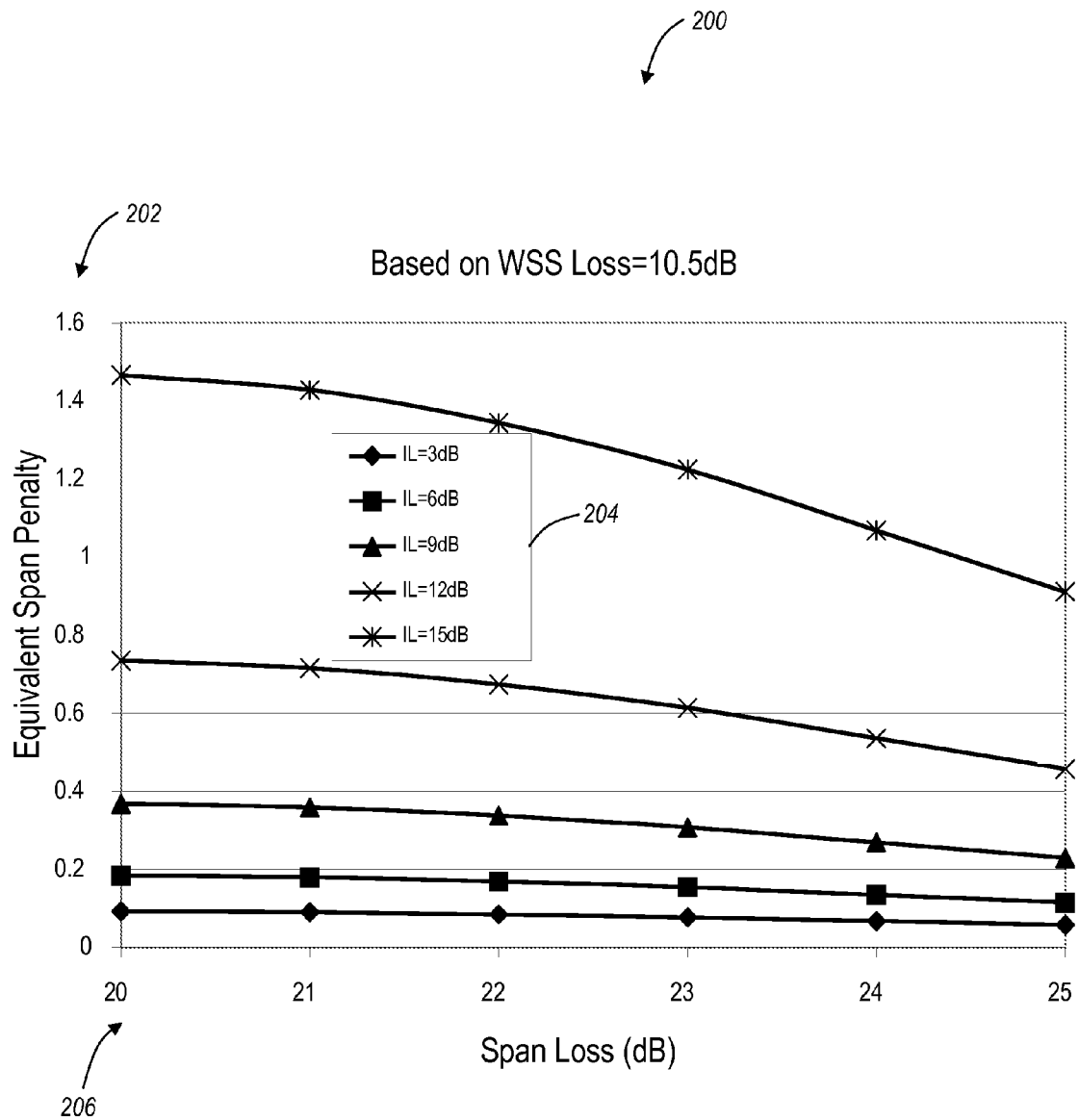
FIG. 2 is a graph of an equivalent span penalty for conventional nodes with different combiner losses as a function of span loss.
Figure 3:
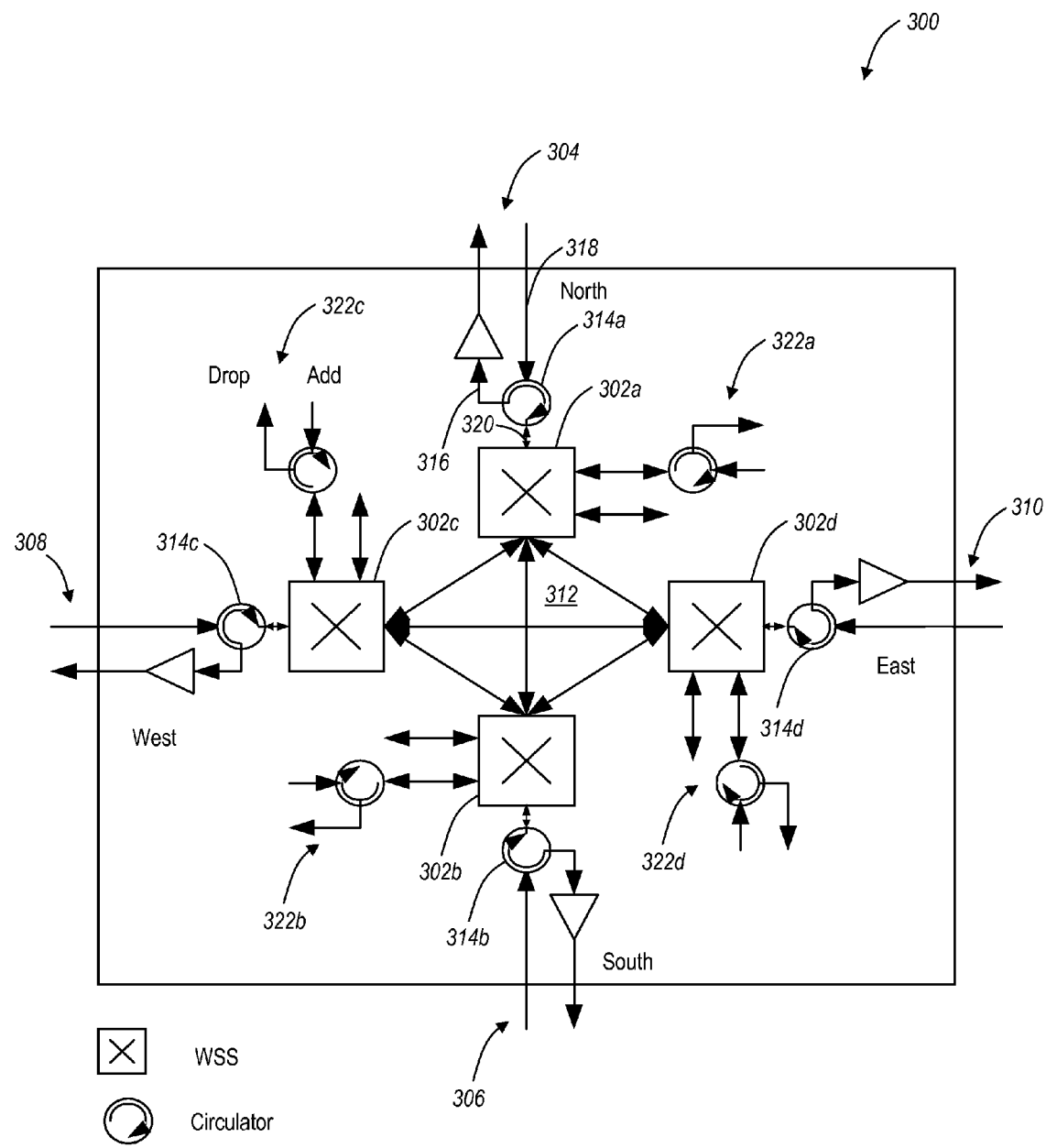
FIG. 3 is a diagram of a four-degree node with a single wavelength selective switch (WSS) for each degree handling ingress and egress bi-directionally according to an exemplary embodiment of the present invention.

Referring to FIG. 3, a four-degree node 300 is illustrated with a single WSS 302 for each degree 304, 306, 308, 310 handling ingress and egress bi-directionally according to an exemplary embodiment of the present invention. Similar to the node 100 of FIG. 1, the node 300 includes the four degrees 304, 306, 308, 310. Four degrees 304, 306, 308, 310 are shown for illustration purposes and those of ordinary skill in the art will recognize that the present invention contemplates any number of degrees. As described herein, the reference to a high-degree ROADM node generally refers to four or more degrees or greater than four degrees.

Each degree 304, 306, 308, 310 provides egress/ingress to/from another node 300, local add/drop, and routing between degrees. In the exemplary node 300, there are four degrees 304, 306, 308, 310 which requires the WSS 302 to include three ports for interconnection to other degrees and one port for both ingress and egress. In the present invention, the single WSS 302 provides each of these functions bi-directionally, i.e. degree interconnection and ingress/egress. Each degree 304, 306, 308, 310 has a respective WSS 302a, 302b, 302c, 302d, and each WSS 302a, 302b, 302c, 302d is interconnected to each of the corresponding WSSs 302a, 302b, 302c, 302d through a plurality of connections 312. Adding an additional degree only requires one extra port on each of the WSSs 302a, 302b, 302c, 302d for an extra connection in the plurality of connections 312.

An optical circulator 314a, 314b, 314c, 314d is connected to a common port of the WSS 302a, 302b, 302c, 302d. At the ingress and egress of each degree, optical signals enter/exit each degree 304, 306, 308, 310 through the optical circulator 314a, 314b, 314c, 314d. The optical circulator 314a, 314b, 314c, 314d is a three-port device that allows light to travel in only one direction, i.e., from port one to port two, then from port two to port three. This means that if some of the light emitted from port two is reflected back to the circulator 314a, 314b, 314c, 314d, it is directed not back to port one, but on to port three. Circulators 314a, 314b, 314c, 314d can be used to achieve bi-directional transmission over a single fiber. In the present invention, the circulators 314a, 314b, 314c, 314d enable both ingress and egress to/from the degree 304, 306, 308, 310 to occupy a single port on the WSS 302a, 302b, 302c, 302d. Specifically, the three ports of each circulator 314a, 314b, 314c, 314d are connected to ingress, egress, and the WSS 302a, 302b, 302c, 302d, respectively.

Taking the north degree 304 as an example, the circulator 314a has a first port 316 to the egress, a second port 318 from the ingress, and a third port 320 to the WSS 302a. The third port 320 includes bi-directional transmission to/from the WSS 302a. Optical signals including a first plurality of wavelengths are sent from the WSS 302a to the circulator 314a to exit the degree 302 through the egress on the first port 316. A second plurality of wavelengths is received from the ingress on the second port 318 and is sent to the WSS 302a through the circulator 314a. Taking advantage of bi-directional nature of normal optical communication links, the bi-directional WSS 302a mainly serves as 1×N wavelength router.

The four-degree node 300 further includes local add/drop ports 322a, 322b, 322c, 322d. These ports 322a, 322b, 322c, 322d include a circulator configured in the same manner as the circulators 314a, 314b, 314c, 314d allowing bi-directional transmission between each local add/drop port 322a, 322b, 322c, 322d and the WSSs 302a, 302b, 302c, 302d. Accordingly, the WSSs 302a, 302b, 302c, 302d provide both ingress and egress for the local add/drop ports 322a, 322b, 322c, 322d. The local add/drop ports 322a, 322b, 322c, 322d can be connected to local DWDM equipment to provide bandwidth at the node 300.

The present invention utilizes the fact that configurations on an ingress or egress WSS normally are symmetric because communication, by nature, is duplex. For example, if a wavelength is routed from east to north, the same wavelength will typically also be routed from north to east. This allows the present invention to introduce a bi-directional configuration of WSS to fulfill the same functionality as the implementation of two WSSs at both ingress and egress of the node.

Figure 4:
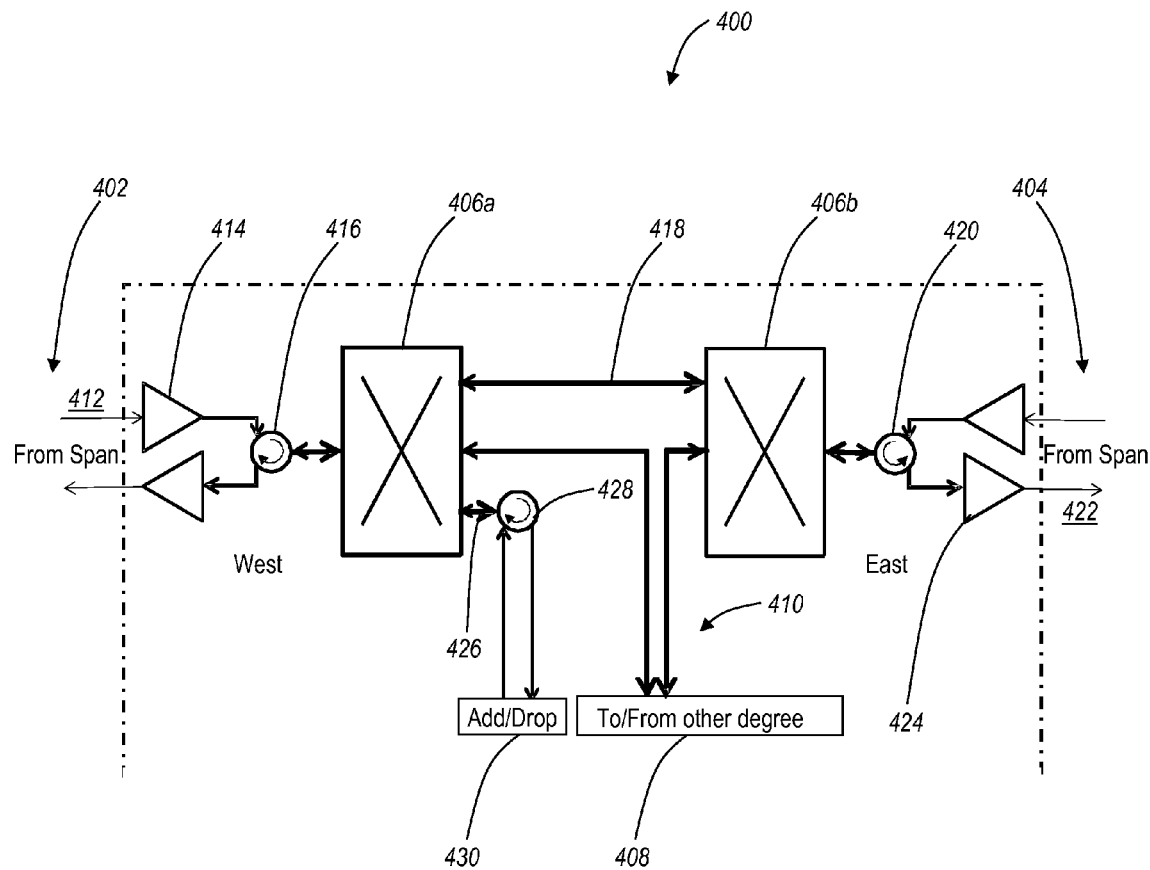
FIG. 4 is a diagram of a detailed node architecture illustrating lighpaths inside a node according to an exemplary embodiment of the present invention.

Referring to FIG. 4, a detailed node architecture illustrates lighpaths inside a node 400 according to an exemplary embodiment of the present invention. FIG. 4 illustrates two degrees 402, 404 each with a WSS 406a, 206b in a high-degree node. The node 400 can include additional degrees 408 with additional connections 410 on each WSS 406a, 406b. These other degrees 408 can be constructed in a similar manner as the degrees 402, 404. At the degree 402, light enters at an ingress 412 to an ingress amplifier 414 and then to a circulator 416. The circulator 416 directs the light from the ingress 412 into the bi-directional WSS 406a.

Express channels from the ingress 412 exit the WSS 406a through a port 418 between the WSS 406a and the WSS 406b. The port 418 can include a pair of fibers or a single fiber with corresponding circulators. The express channels go through the WSS 406b, e.g. through a common port, to a circulator 420. The circulator 420 separates these express channels (along with any locally added channels) and sends them to an egress 422 through an egress amplifier 424. This process is similar for interconnecting any two degrees in the node 400.

Local add/drop channels are on a port 426 on the WSS 406a. The port 426 connects to a circulator 428. The circulator 428 provides ingress and egress for locally add/drop channels 430. Then, the locally add/drop channels 430 are sent on an add/drop fiber pair to either a multiplexer/de-multiplexer or directly to a transceiver.

Figure 5A:
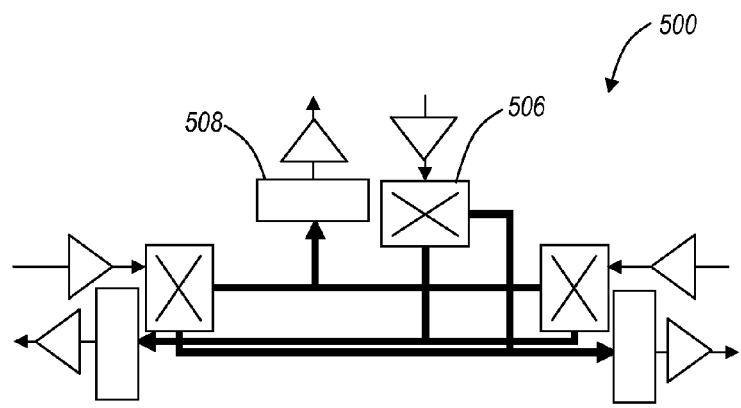
FIGS. 5a-5c are diagrams of a three-degree node configured with a combiner and WSS (FIG. 5a), dual WSSs (FIG. 5b), and a bi-directional WSS (FIG. 5c) according to an exemplary embodiment of the present invention.
Figure 5B:
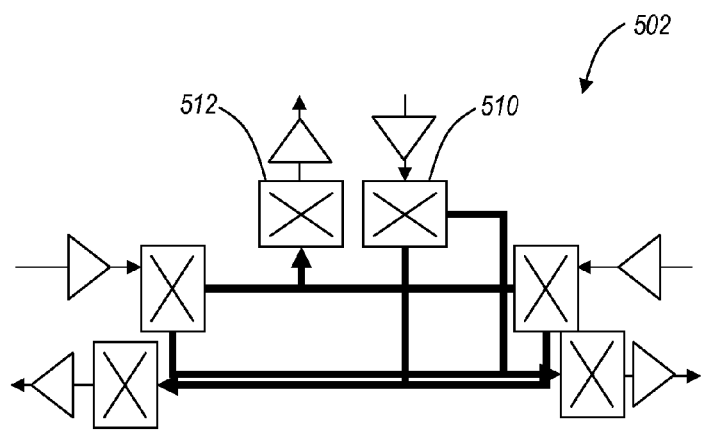
Figure 5C:
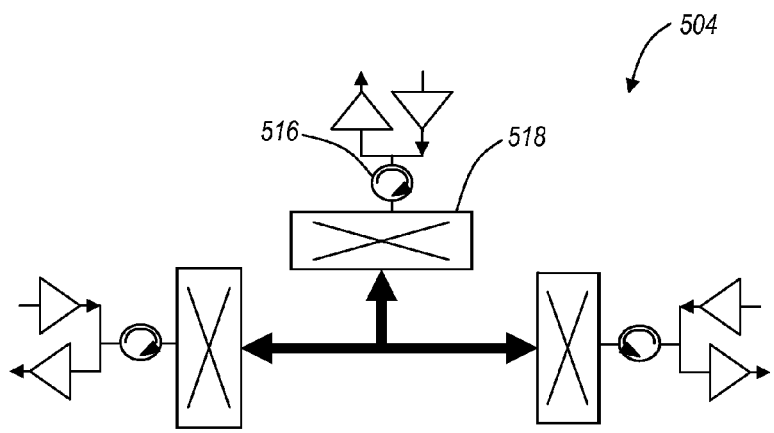

Referring to FIGS. 5a-5c, a three-degree node is illustrated configured with a combiner and WSS (node 500), dual WSSs (node 502), and a bi-directional WSS (node 504) according to an exemplary embodiment of the present invention. As described herein, the node 500 is a conventional configuration utilizing a WSS 506 on the ingress and a combiner 508 on egress. The node 500 presents a challenge to expand the number of degrees. The node's 500 internal loss linearly grows as the number of degrees increase playing a big role as the noise figure of the node 500. Disadvantageously, high degree nodes constructed using the configuration of node 500 impact overall system reach. The insertion loss associated with the node 500 as a function of the number of degrees, N, is characterized by:

$$\text{Node\_IL} = \text{WSS\_IL} + \text{Combiner\_IL} * (10 * (\log_{10}(N)))$$

FIG. 5b illustrates the node 502 with dual WSSs 510, 512 for each degree. This configuration overcomes the insertion loss issues associated with the node 500 utilizing a fixed internal loss scheme for a high-degree node to achieve an easy path for node expansion. However, the node 502 has increased cost due to doubling the expensive WSSs 510, 512 for each degree. This can be especially burdensome in metro/regional DWDM applications. The insertion loss associated with the node 502 is independent of the number of degrees, N, and is characterized by:

$$\text{Node\_IL} = 2 * \text{WSS\_IL}$$

FIG. 5c illustrates the node 504 with a single bidirectional WSS 514 and a circulator 516 for both ingress and egress on each degree. The node 504 is configured similarly to the nodes 300, 400 in FIGS. 3 and 4. Here, the ingress and egress optical signals enter/exit on the same common port of the WSS 514. Similar to the node 502, the node 504 has a fixed insertion loss regardless of the number of degrees, N, without the additional cost and equipment of an extra WSS. The insertion loss for the node 504 is characterized by:

$$\text{Node\_IL} = 2 * \text{WSS\_IL}$$

Figure 6:
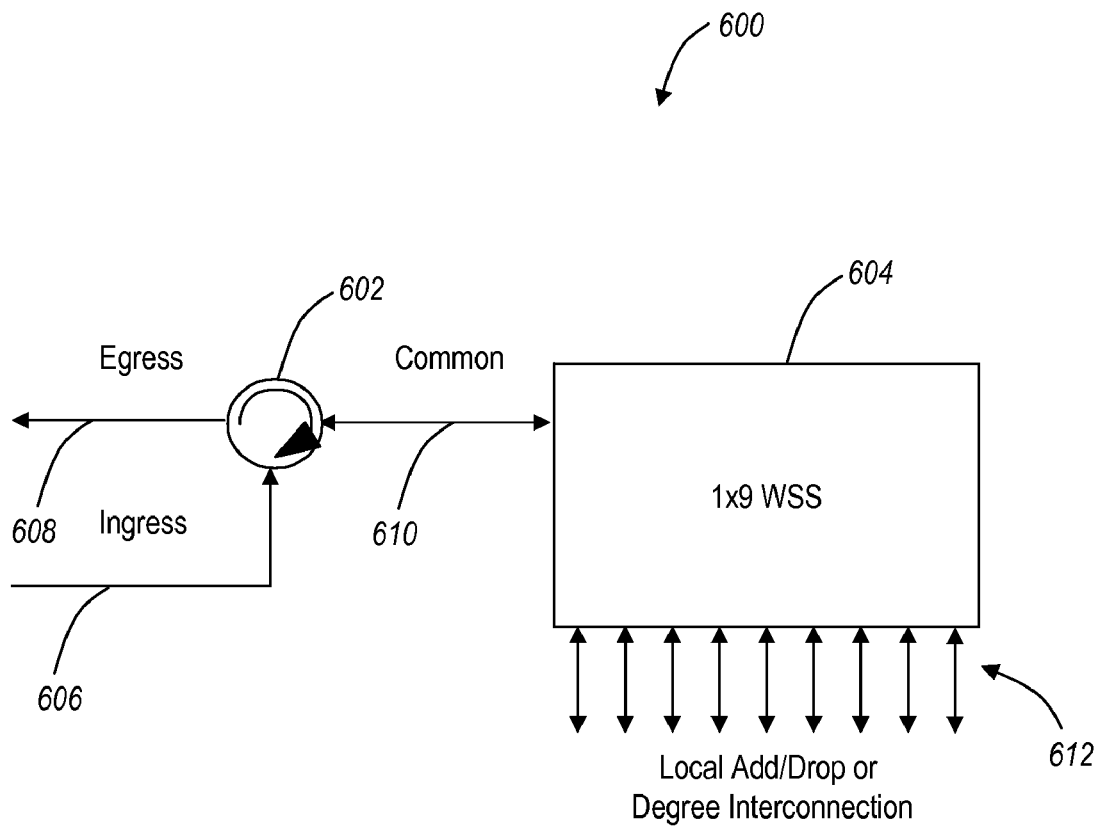
FIG. 6 is a diagram of a degree with a circulator and a 1×9 bidirectional WSS according to an exemplary embodiment of the present invention.

Referring to FIG. 6, a degree 600 is illustrated with a circulator 602 and a 1×9 bi-directional WSS 604 according to an exemplary embodiment of the present invention. As described herein, the circulator 602 includes three ports connecting to the degree 600's ingress 606, egress 608, and a common port 610 of the WSS 604. In addition to the common port 610, the WSS 604 includes nine bidirectional ports 612. The bi-directional ports 612 can be utilized to provide local add/drop or to interconnect to other degrees. For local add/drop, each bidirectional port 612 includes a circulator (not shown) in a similar configuration as the ingress 606 and egress 608 to provide bi-directional local add/drop on one port in the WSS 604. For degree interconnection, the bi-directional ports 612 are connected to corresponding bi-directional ports 612 on another degree.

Accordingly, the 1×9 bi-directional WSS 604 can support up to nine degrees with no local add/drop, up to eight degrees with one local add/drop port, up to seven degrees with two local add/drop ports, and the like. The present invention is illustrated here with the 1×9 bi-directional WSS 604 and those of ordinary skill in the art will recognize that the present invention contemplates any WSS port configuration. Advantageously, the bi-directional WSS 604 simplifies connections between degrees enabling easier operation and expansion. Also, the bi-directional WSS 604 can be utilized to provide a filtering function between adding channels and express channels. This can be useful for 100 Gb/s optical signals at 50 GHz spacing.

The bi-directional WSS 604 needs to achieve good Return Loss (RL) (back-reflection) performance at each port 612 to avoid coherent crosstalk. For example, the bi-directional WSS 604 can include a Microelectromechanical (MEMS)-design or the like. The bi-directional WSS 604 can be constructed as a 1×N bi-directional WSS where N can be any number, e.g. 1×5, 1×9, 1×20, and the like.

Figure 7:
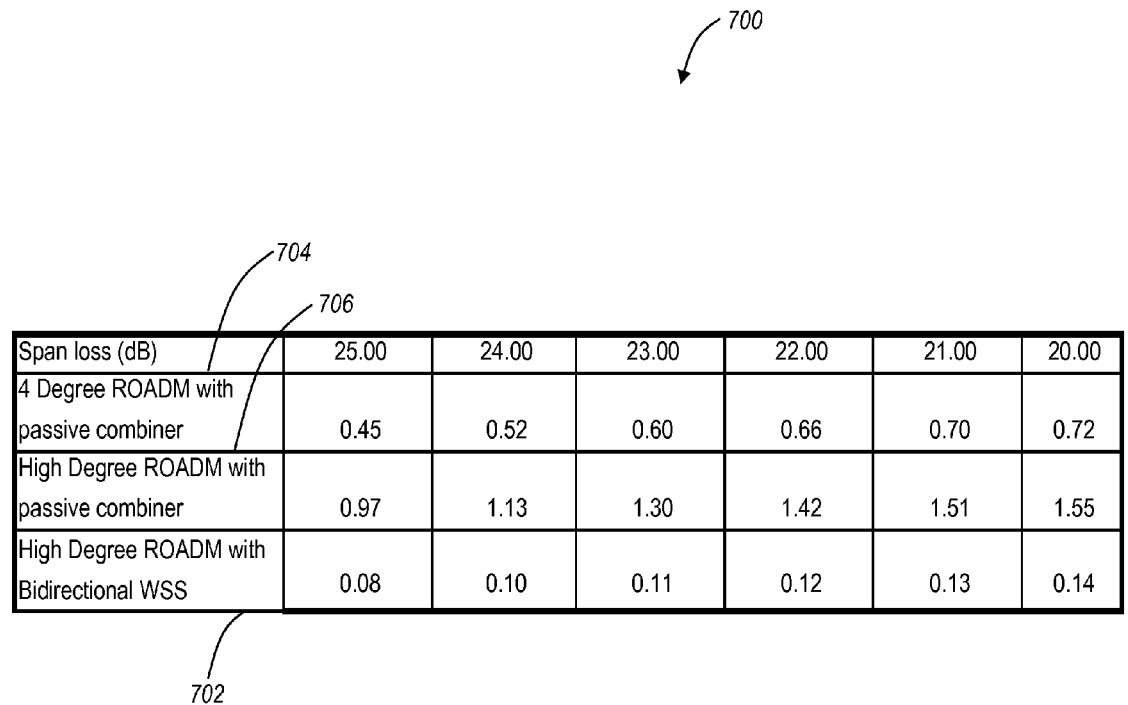
FIG. 7 is a table of an equivalent span penalty for different span losses with the bi-directional WSS approach of the present invention compared to conventional combiner approaches.

Referring to FIG. 7, a table 700 illustrates an equivalent span penalty for different span losses with the bi-directional WSS approach of the present invention compared to conventional combiner approaches. As described herein, the present invention eliminates combiners at main traffic routing paths at a node, therefore, the intra-node insertion loss is capped to a certain value (i.e., 2×WSS IL for the case in the FIG. 5c) and it does not scale with the number of degrees, as did in traditional structure using combiners. From a node's power amplification point of view, it will significantly improve node optical signal-to-noise ratio (OSNR) penalty. In the conventional structure using combiners, for high degrees, such as eight degrees, the combiner loss is much higher than the WSS insertion loss. This is because each degree is designed to support maximum channel capacity.

With the WSS bi-directional approach of the present invention, the WSS dynamically routes the traffic and more efficiently utilizes coupling loss and hence reduces insertion loss compared with conventional approaches. The table 700 illustrates equivalent span penalties for different span losses (e.g., 25 dB, 24 dB, 23 dB, etc.) with the bi-directional WSS approach 702 of the present invention and a traditional combiner approach including a four-degree node 704 and a high-degree node 706. As can be seen in the table 700, the bi-directional WSS approach 702 yields a low, fixed span penalty of about 0.08 dB to 0.14 dB for a high-degree node versus span penalties for the conventional approaches 704, 706.

Figure 8:
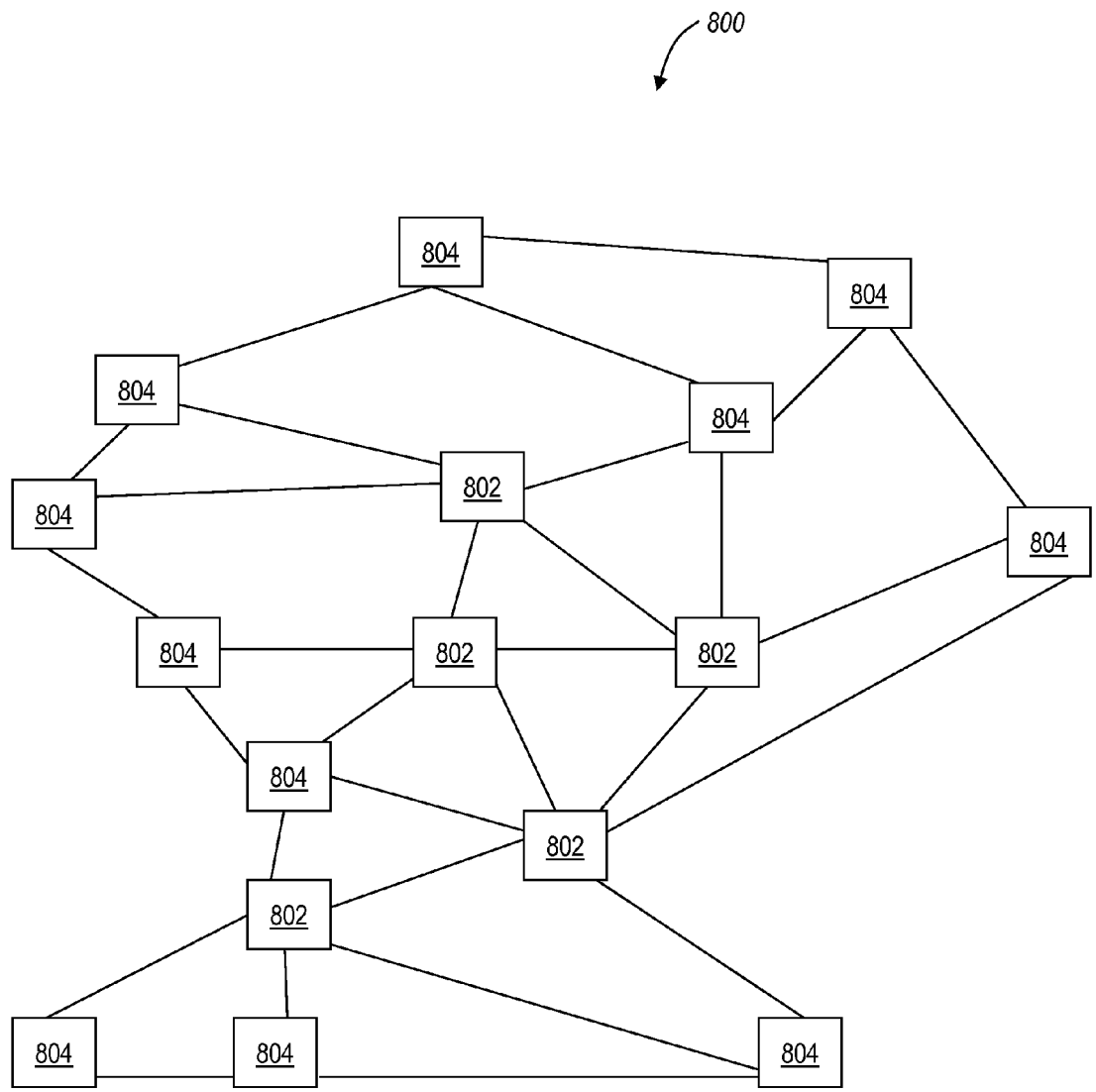
FIG. 8 is a network diagram of an optical network with multiple high-degree nodes and low-degree nodes according to an exemplary embodiment of the present invention.

Referring to FIG. 8, an optical network 800 is illustrated with multiple high-degree nodes 802 and low-degree nodes 804 according to an exemplary embodiment of the present invention. Importantly, the present invention reduces the noise penalty issue without a significant cost increase (i.e., using twice the number of WSSs, etc). In the present invention, ripple equalization feature at high-degree nodes is sacrificed since a bi-directional configuration shares the same attenuation in both directions; however, most networks have few high-degree nodes (e.g., higher than four degrees) in conjunction with multiple low-degree nodes (e.g., four degrees and lower). So one can consider a deployment situation where a conventional approach (i.e., WSS plus combiners) is used for lower degree (e.g., four and lower) nodes and the bi-directional WSS of the present invention is used for high degree nodes, allowing intermixing of both approaches in a real network, such as depicted in FIG. 8. The conventional nodes, i.e. the nodes 804 in the optical network 800, are able to perform the ripple equalization function and with a low OSNR penalty. Also, from the node structure point of view in the nodes 802, with the bi-directional WSS, the node 802 needs less hardware for the extra degrees, simplifying interconnections and deployment.

Figure 9:
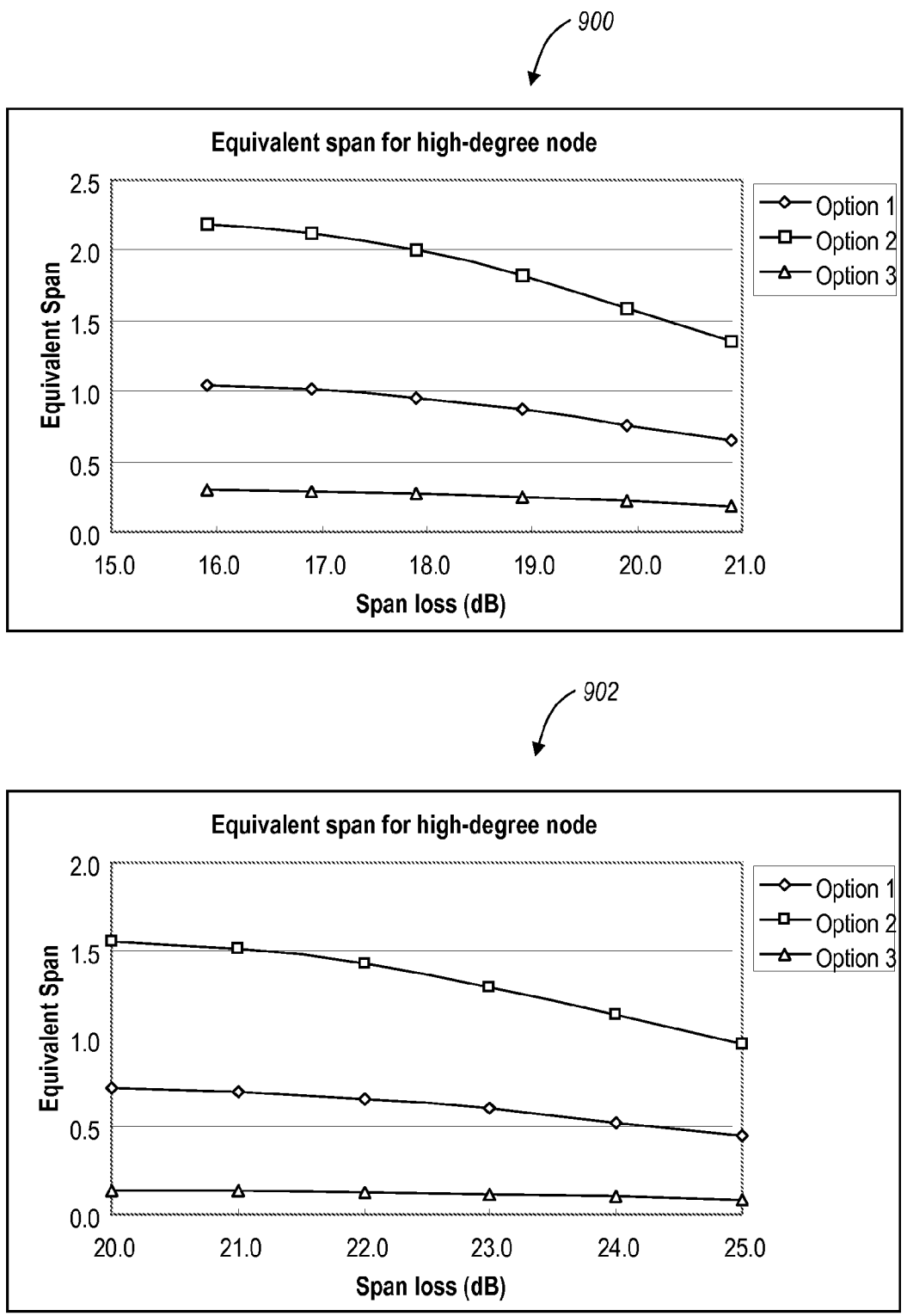
FIG. 9 is two graphs of equivalent span penalties of conventional approaches (options 1 and 2) versus the bi-directional WSS approach of the present invention (option 3) for different span losses.

Referring to FIG. 9, two graphs 900, 902 illustrate equivalent span penalties of conventional approaches (options 1 and 2) versus the bi-directional WSS approach of the present invention (option 3) for different span losses. Option 1 is a conventional low-degree (i.e., four or less degrees) node with combiners and WSSs. Option 2 is a conventional high-degree node with combiners and WSSs, and Option 3 is a bi-directional WSS.

Advantageously, the present invention provides a low-cost, reduced footprint configuration with minimal OSNR penalties due to high-degree ROADM nodes. Assuming 1-2 dB overall OSNR benefit from the high-degree ROADM node, approximately 30%-50% longer reach can be realized with the present invention with minimal additional cost. This can reduce optical-electrical-optical regeneration in network design. Similar analysis (for example in ripple reduction) has shown a 2-8% cost benefit to network designs.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A high-degree reconfigurable optical add-drop multiplexing node, comprising:
    a plurality of degrees each comprising an ingress and an egress;
    wherein each of the plurality of degrees comprise:
        a circulator comprising a first port, a second port, and a third port, wherein the ingress is coupled to the first port and the egress is coupled to the second port; and
        a bi-directional wavelength selective switch coupled to the third port, the circulator is configured to direct optical signals between the ingress, the egress, and the bi-directional wavelength selective switch; and
    wherein the bi-directional wavelength selective switch of each of the plurality of degrees is coupled to the bi-directional wavelength selective switches of the others of the plurality of degrees via a port to port link without intervening optical couplers.

2. The high-degree reconfigurable optical add-drop multiplexing node of claim 1, further comprising:
    one or more local add/drop ports coupled to the bi-directional wavelength selective switch.

3. The high-degree reconfigurable optical add-drop multiplexing node of claim 2, wherein each of the one or more local add/drop ports comprise:
    a local ingress and a local egress;
    a second circulator comprising a fourth port, a fifth port, and a sixth port, wherein the local ingress is coupled to the fourth port and the local egress is coupled to the fifth port; and
    a second bi-directional wavelength selective switch coupled to the sixth port, the second circulator is configured to direct optical signals between the local ingress, the local egress, and the second bi-directional wavelength selective switch.

4. The high-degree reconfigurable optical add-drop multiplexing node of claim 1, wherein the bi-directional wavelength selective switch comprises a common port coupled to the third port and N ports, N being an integer greater than one.

5. The high-degree reconfigurable optical add-drop multiplexing node of claim 4, further comprising a plurality of interconnections between the plurality of degrees, wherein each of the plurality of interconnections comprise a connection on one of the N ports of each bi-directional wavelength selective switch.

6. The high-degree reconfigurable optical add-drop multiplexing node of claim 4, wherein the plurality of degrees comprise up to N degrees.

7. The high-degree reconfigurable optical add-drop multiplexing node of claim 4, wherein the plurality of degrees comprise X degrees, X being an integer, wherein the high-degree reconfigurable optical add-drop multiplexing node further comprises Y local add/drop ports, Y being an integer, and wherein X+Y is less than or equal to N.

8. The high-degree reconfigurable optical add-drop multiplexing node of claim 1, wherein the high-degree reconfigurable optical add-drop multiplexing node comprises no combiners thereby fixing insertion loss in the high-degree reconfigurable optical add-drop multiplexing node regardless of the number of the plurality of degrees.

9. An optical degree for reconfigurable optical add-drop, comprising:
an ingress port;
an egress port;
an optical circulator comprising a first port, a second port, and a third port, the first port coupled to the ingress port and the second port coupled to the egress port;
a bi-directional wavelength selective switch coupled to the third port thereby enabling optical signals between the bi-directional wavelength selective switch, the ingress port, and the egress port; and
one or more interconnections from a plurality of ports on the bi-directional wavelength selective switch, the one or more interconnections connected to additional optical degrees without intervening optical couplers.

10. The optical degree of claim 9, wherein the bi-directional wavelength selective switch comprises 1×N ports, N being an integer greater than one.

11. The optical degree of claim 10, further comprising a plurality of local add/drop ports, wherein the quantity of local add/drop ports is less than or equal to N.

12. The optical degree of claim 11, wherein each of the plurality of local add/drop ports comprise:
a local ingress and a local egress;
a second circulator comprising a fourth port, a fifth port, and a sixth port, wherein the local ingress is coupled to the fourth port and the local egress is coupled to the fifth port; and
a second bi-directional wavelength selective switch coupled to the sixth port, the second circulator is configured to direct optical signals between the local ingress, the local egress, and the second bi-directional wavelength selective switch.

13. The optical degree of claim 10, wherein the optical degree is utilized in a reconfigurable optical add/drop node comprising up to N degrees.

14. The optical degree of claim 13, wherein the optical degree comprises no combiners thereby fixing insertion loss in the reconfigurable optical add/drop node regardless of the number of degrees.

15. An optical network, comprising:
one or more low-degree nodes;
one or more high-degree nodes;
optical interconnections between the one or more low-degree nodes and the one or more high degree nodes;
wherein each of the one or more high-degree nodes comprise:
a plurality of degrees each comprising an ingress and an egress;
wherein each of the plurality of degrees comprise:
a circulator comprising a first port, a second port, and a third port, wherein the ingress is coupled to the first port and the egress is coupled to the second port; and
a bi-directional wavelength selective switch coupled to the third port, the circulator is configured to direct optical signals between the ingress, the egress, and the bi-directional wavelength selective switch; and
wherein the bi-directional wavelength selective switch of each of the plurality of degrees is coupled to the bi-directional wavelength selective switches of the others of the plurality of degrees via a port to port link without intervening optical couplers.

16. The optical network of claim 15, wherein the one or more low-degree nodes comprise a wavelength selective switch and an optical combiner, and wherein the one or more low-degree nodes are configured to provide gain equalization.

17. The optical network of claim 16, wherein the one or more high-degree nodes do not provide gain equalization.

18. The optical network of claim 15, wherein the one or more high-degree nodes comprise no combiners thereby fixing insertion loss in the one or more high-degree nodes regardless of the number of degrees.

19. The optical network of claim 15, wherein the one or more low-degree nodes each comprise less than four degrees and the one or more high-degree nodes comprise four or more degrees.

20. The optical network of claim 15, wherein the one or more low-degree nodes each comprise four or less degrees and the one or more high-degree nodes comprise more than four degrees.

* * * * *